Feb. 18, 1969   H. H. FRANK   3,427,672
DRIVE RELEASE POWER TOOL
Filed April 25, 1966   Sheet 1 of 2
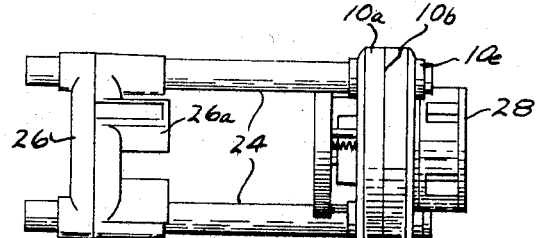
Fig. 1
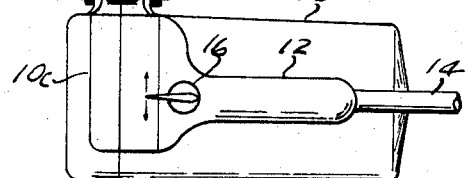
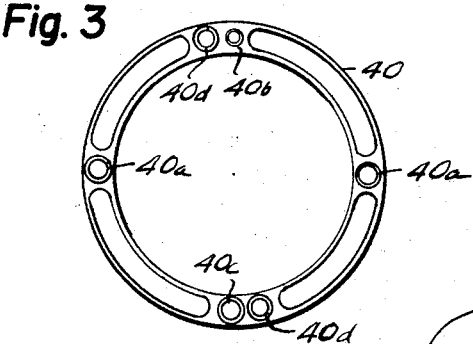
Fig. 3
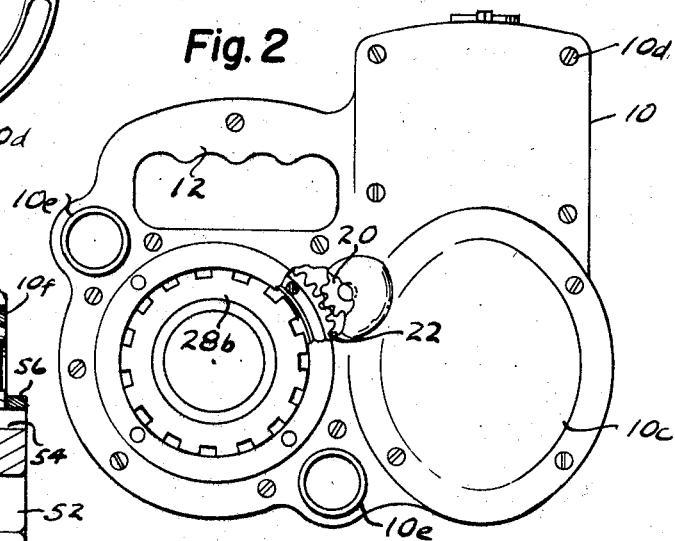
Fig. 2
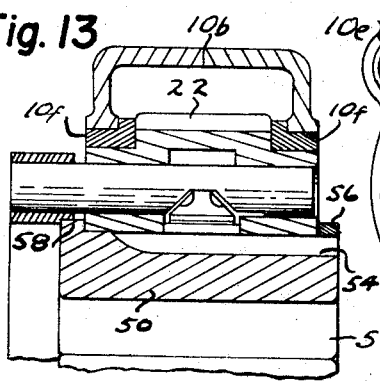
Fig. 13
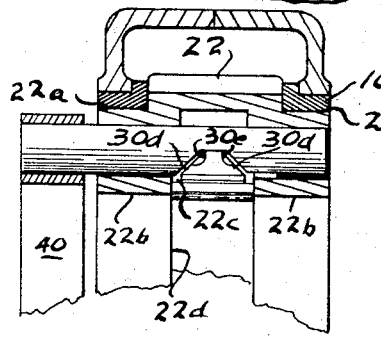
Fig. 11
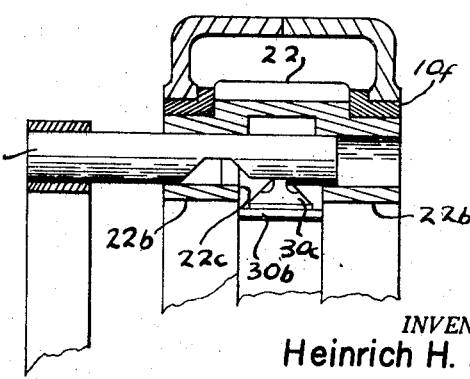
Fig. 12
INVENTOR.
Heinrich H. Frank
BY
J. D. Douglas
His atty

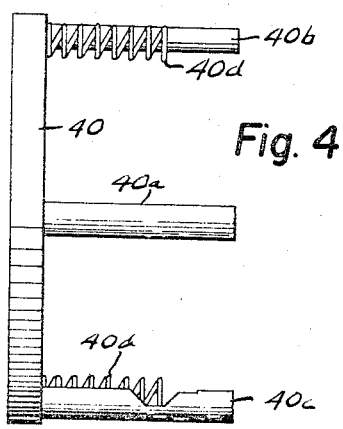
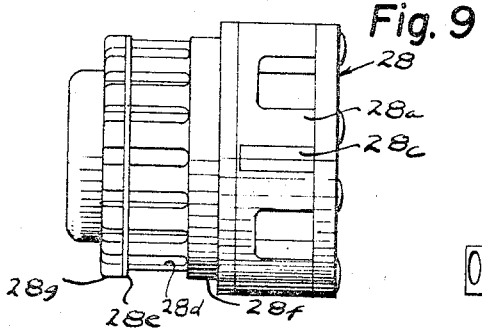
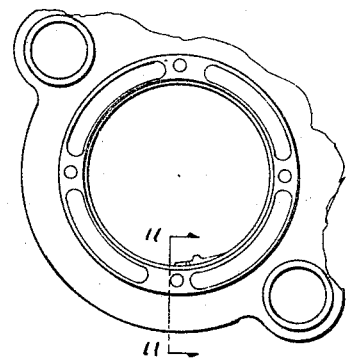
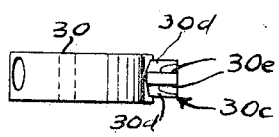
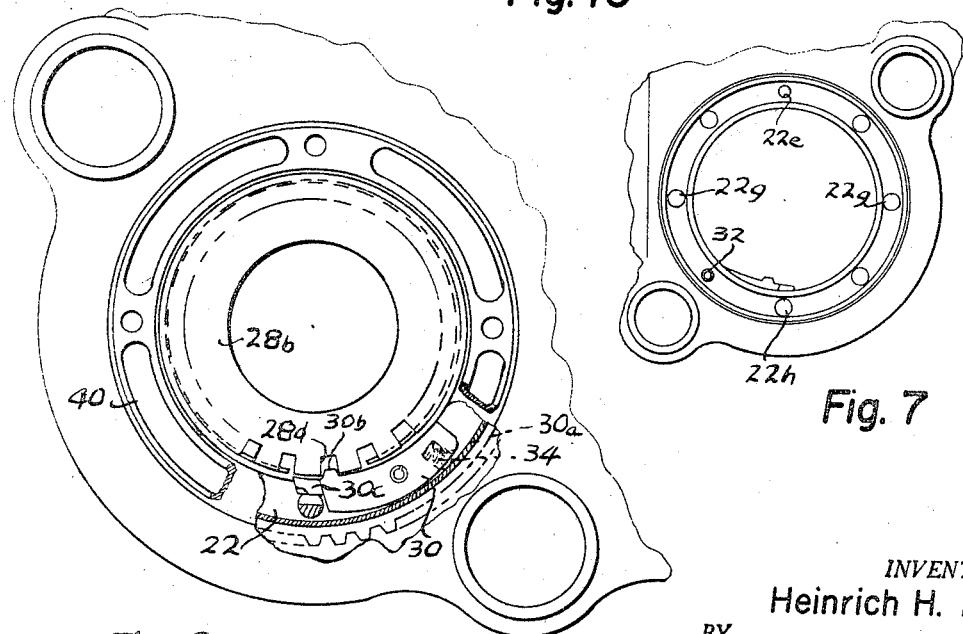

United States Patent Office 3,427,672
Patented Feb. 18, 1969

3,427,672
DRIVE RELEASE POWER TOOL
Heinrich H. Frank, Amherst, Ohio, assignor to Emerson Electric Co., St. Louis, Mo., a corporation of Missouri
Filed Apr. 25, 1966, Ser. No. 544,796
U.S. Cl. 10—89                    14 Claims
Int. Cl. B23g *1/24, 11/00;* B21k *1/56*

ABSTRACT OF THE DISCLOSURE

A ring gear is disposed in a housing driven by a motor. A die head is rotatably mounted in the ring gear and is driven by a spring pressed pawl carried in a channel in the ring gear. The housing also supports a workholder which holds the work in alignment with the die head. As the die head is revolved the threads are cut on the work and this causes the workholder to move toward the die head. When the workholder approaches the die head it engages with a release ring reciprocably carried by the ring gear on posts that extend through openings in the ring gear. One of the posts has cam surfaces thereon which control the operation of the pawl to cam it out of driving engagement with the die head. The pawl also holds the die head and the release ring and its posts in position and can be moved to release the die head and the release ring whereby they may be assembled from the other side of the ring gear with it when desired.

---

This invention relates to a means for terminating a driving relation between a driving and a driven member and more particularly to a drive release for a power driven tool such as one for performing a threading or cutting operation on a pipe or rod.

In the threading of pipe and rods there is frequently provided a power driven threading die and a chuck or work-holder for holding the rod or pipe which automatically advances toward the die as the threading proceeds. It is desirable to provide means for automatically terminating the threading action before the work-holder or chuck engages with the die to prevent the jamming thereof. It is also desirable in some instances to terminate the threading after a certain amount of threads have been cut. Recently there have come on the market portable threading machines which usually comprise a motor disposed in a housing and which drives a die head through a train of gears. Some of these devices include a work-holder, which may be some form of chuck, which holds the work against turning during the threading operation. Such devices inherently have a powerful motor and unless means is provided to automatically stop the motor after the threading operation the mechanism may become jammed, which frequently causes damage.

The present invention contemplates a device which, as the work enters between the chasers, eventually causes the drive to be released, preventing any jamming of the work-holder and die.

Still other advantages of the invention, and the invention itself, will become more apparent from the following description of an embodiment thereof which is illustrated by the accompanying drawings and forms a part of this specification.

In the drawings:

FIG. 1 is a plan view of a portable threading tool incorporating the drive release of the invention;

FIG. 2 is an end view of the tool of FIG. 1 on an enlarged scale, and with the work-holder removed, certain parts being broken away to show the underlying structure;

FIG. 3 is an enlarged rear elevational view of a drive release ring removed from its associated structure;

FIG. 4 is a side elevational view thereof;

FIG. 5 is a fragmentary view of a drive release cam pin;

FIG. 6 is a fragmentary front end view of the die holding portion with the die removed;

FIG. 7 is a similar view to FIG. 6 taken from the opposite side;

FIG. 8 is an enlarged fragmentary front view with certain parts broken away to show the underlying parts;

FIG. 9 is an elevational view of a die head such as may be used in the machine;

FIG. 10 is an enlarged plan view of a drive release pawl;

FIG. 11 is an enlarged fragmentary section taken from the line 11—11 of FIG. 6 and showing the drive release pawl and the associated cam pin in the "drive released" position;

FIG. 12 is a similar view in the "drive" position; and

FIG. 13 is a view similar to FIG. 11 of a modified form of the invention.

Briefly, the invention contemplates a die head removably carried by a ring gear which is driven by a motor means through a reduction gearing. The gear is supported by a housing and the die head is removably carried inside the ring gear. Releasable drive means interconnects the gear with the die head. The housing which carries the die head has a pair of supports on which a work-holder or chuck is slidably journalled. A release ring is carried by the drive gear being disposed in the path of and arranged to be contacted and moved by the work-holder as it progresses toward the die head. The release ring has a cam pin which cooperates with the releasable drive means to cause a driving relation between the die head and ring gear when the release ring is in the normal position, and, to actuate the releasable means when the ring is contacted by the work-holder to discontinue the driving relation between the ring gear and the die head.

One aspect of the invention includes the capability of removing the die head, drive release ring and work-holder and installing them in a reversed position to that shown in the drawings, when a more compact assembly is desired.

More specifically there is provided a motor housing 10, provided with a carrying handle 12. The motor is powered through the cord 14 and switch means, not shown, is provided in conjunction with the handle for switching the motor on and off. A reversing switch 16 is provided for reversing the direction of the motor drive.

The front end of the motor housing contains a reduction gearing, not shown, since it is well known in the art, which drives a drive pinion 20, FIG. 2. A laterally extending portion 10a of the housing is provided at the front of the housing and a ring gear 22 is rotatably mounted in an opening which extends through the housing parts. As can be seen from FIGS. 1 and 11 the front of the motor housing and the laterally extended portion which houses the reduction gearing and the ring gear, is made in two parts, the parting line being shown at 10b, in order that the front or cover part 10c may be removed to facilitate assembly. The front cover is held in place on the main housing by screws 10d. The ring gear 22 is drive by the pinion 20.

The lateral extension 10a is provided with a pair of hollow bosses 10e which slidably support rods 24 that in turn carry a work-holder 26. This enables the work-holder with the pipe or rod to be threaded to be slid toward and into engagement with the threading die 28.

As can best be seen from FIGS. 11 and 12 the openings through the housing have bearings 10f pressed therein and the ring gear 22 is provided with peripheral shoulders 22a whereby the gear is rotatably journalled in the bearings. The inner surface of the gear is formed with a pair of smooth cylindrical, spaced die head supporting surfaces 22b that flank a circumferential channel 22c and provide guide and support means for the die head, the stem 28b of which rides on said support surfaces (FIG. 2).

The die head may be conventional including the head part 28a that carries the thread cutting chasers 28c. The stem 28b is provided with longitudinally extending flutes 28d and a keeper ring 28e is set into the stem. The surface 28f, when the die head is inserted in the ring gear, rides one of the bearing surfaces 22b and the surfaces 28g outwardly of the ring 28g ride on the other bearing surface 22b, depending upon which direction the die head is inserted in the ring gear.

Means is provided, carried by the ring gear and engaging with one of the walls in the stem of the die head, defined by the flutes 28d, to effect a driving relation between the ring gear and the die head. This means also prevents the die head from falling out and holds a drive release ring in position.

The drive connecting means is a pawl which is pivotally journalled in the channel 22c of the ring gear. As can best be seen in FIG. 10, it includes an arcuate body 30 of rectangular cross section, which is pivotally supported in the channel 22c on a roll pin 32 which extends through the walls 22b flanking the channel. Adjacent one end of the pawl there is provided a pocket 30a and a helical spring 34 is seated in the pocket under compression between the bottom of the pocket and the outer wall 22d of the channel 22c, holding the pawl spring pressed in a counterclockwise direction, as viewed in FIG. 8. The other end of the pawl is provided with a lug 30b having slanting side walls which may be engaged in one of the flutes 28d in the stem of the die head. Normally the pressure of the spring 34 is such as to cause the pawl to be rocked with the lug disengaged. The pawl is provided with an extension 30c of generally triangular cross section and slightly narrower than the body, which is engaged by a pin on a drive release ring. The slanting sides 30d of the extension provide cam surfaces for engagement with the drive release ring cam, later described; they are notched at the apex to provide a pair of vertical walls 30e on opposite sides.

The drive release actuator is a means which is arranged to be engaged by the work-holder as it approaches the die head, to prevent the work-holder from jamming against the die head. It can also be arranged to stop the threading operation when the desired number of threads have been cut. It operates the pawl to withdraw the lug 30b from driving engagement with the die head stem and terminate the driving engagement therebetween. FIGS. 3 and 4 show the drive release as being a ring 40 having a plurality of posts extending from one side parallel to the axis. The posts 40a are plain cylindrical posts, the only purpose of which is to guide the ring. The post 40b is a locater and guide post, being of smaller diameter than the other posts. It may be made from a roll pin. Post 40c is a guide and pawl operating post. Helical springs 40d are set into the ring and extend parallel to the posts. Their function is to engage with the side of the drive ring and keep the release ring spring-pressed to an outer position.

The ring gear sides are provided with openings for receiving the various posts, as shown in FIG. 7, the openings 22g receiving the posts 40a, the opening 22h receiving the cam post 40c, and the opening 22e receiving the locater post 40b. As previously stated, the drive release ring, the work-holder with its support rods, and the die head may be assembled with housing and ring gear from either side. FIGS. 11 to 13 show the release ring assembled on the back and the remaining figures show it assembled from the forward side. The operation in either case is the same. The drive release ring is assembled in the ring gear by inserting the four pins in the proper openings and pressing the pawl 30 on the end adjacent to the spring 34 to move the projection 30d out of the path of the cam pin 40c; then the ring is pushed to the right, as viewed in the figures, and the pawl released to engage with the cam post 40c and hold it in position. The springs 40d hold the ring in its outermost position.

As best shown in FIGS. 4, 8, 11 and 12, the cam post is provided with a cam surface which includes a pair of spaced slanting walls 40e and 40f which extend transversely across the pin. At 40g a portion of the post is removed on a cord to provide a shoulder 40h. As best shown in FIG. 12 the shoulder 40h on the cam post engages with one of the vertical side walls 30e on the pawl when the springs 40d press the ring outward and hold the ring and its posts against accidental removal. In this position, as shown in FIGS. 8 and 12, the pawl is pressed inward against the pressure of the spring 34 and the lug 30b held in one of the flutes of the stem of the die head, establishing a driving relation between the ring gear and the die head. The die head is also held in the ring gear due to the fact that the one side of the pawl lug 30b engages with the lock ring 28e on the die head stem.

As the threading progresses and the work-holder moves toward the die head, eventually the pipe gripping jaw holding bosses 26a engage with the ring and move it inward to nearly the position shown in FIG. 11. As this occurs one of the tapered or slant surfaces 30a on the pawl end causes the pawl to be forced outward into the space between the cam faces 40e and 40f, due to the rotational force. This is a gradual withdrawal of the lug 30b from between the walls of the flute on the die head stem and eventually terminates the driving relation between the ring gear and die. The ring gear may now revolve freely without driving the die head.

The work-holder is now manually released and moved to the left. This causes the drive release ring to move to its outward position and the pawl 30 to again engage with the die head. The motor may now be reversed and the die will unthread itself from the pipe and the work may be withdrawn.

It is pointed out that although the lug 30b is withdrawn from its driving relation with the die head slightly before it reaches the position in FIG. 11 and it is still opposite to the retainer ring 28e on the die stem and that therefore the die is still retained within the drive ring. FIG. 11 shows the extreme inward position of the drive release when it is desired to remove the die head and/or the release ring.

It is apparent that should the worker be careless and not turn the motor off when the desired amount of threads have been cut, the cutting will automatically stop and the work-holder cannot jam up against the drive unit and cause damage.

If it is desired to change the dies, the ring is merely pressed inward by hand until it reaches the position shown in FIG. 11, at which time the lug 30b is beyond the retainer ring 28e and the die head may be removed. After the die head is removed the pawl may be pressed by the finger opposite to the spring 34 to withdraw the end 30d from the engagement with the wall 30e and the ring with its posts removed.

As previously mentioned, although the invention is peculiarly adapted for use with a portable power driven threading die, it can also be used for other purposes where it is desirable to establish a driving relation between driving and driven members. It is also apparent that the die head does not have to be of the character as shown in FIG. 9, since one without the fluted stem could be used.

FIG. 13 illustrates, in a manner similar to FIG. 11, a driven member 50 which is rotatably journalled in the bearings 22b. It is formed with an opening 52 of polygonal cross section which may receive a similarly shaped polygonal shaft, not shown. The shaft may be on a die head or other device. The member 50 is provided with at least one notch or groove 54, a wall of which cooperates with the pawl 30 to be driven thereby in the manner described. It may be held permanently within the bearings by a shoulder 58 on one end and a ring 56 which is staked in position on the other end.

Having thus described the invention in an embodiment thereof, I am aware that numerous and extensive departures may be made therefrom without departing from the spirit or scope of the invention as defined by the appended claims.

I claim:

1. A power driving device including a motor driven member and a means for holding a part against rotation and movable with the part toward the member, drive means for driving relation with the member and means between the member and drive means and movable into and out of driving relation between the drive means and member for establishing driving relation therebetween, and means disposed in the path of travel of the holding means toward the member and engaged by said holding means as it moves into proximity to the member to actuate said movable means to move said movable means out of driving relation between the drive means and member, said drive means being formed with a bearing and said member being rotatably mounted therein, said means for establishing driving relation between the member and drive means including a pawl pivotally carried by the drive means and said member has a portion with at least one pawl engaging seat therein and said pawl is engaged in said seat.

2. An apparatus as described in claim 1, wherein spring means is provided for moving said pawl out of engagement with said member.

3. An apparatus as described in claim 1, wherein means is disposed in the path of travel of said holding means and includes a first portion engaged with said pawl designed to move said pawl into engagement with said member.

4. An apparatus as described in claim 1, wherein said motor driven member has means for holding it in position for engagement with said pawl, and wherein said means disposed in the path of travel of the holding means includes a cam surface means operably engaging said pawl and disposed to move the pawl to a first position to disengage said pawl from said pawl engaging seat and a second position to disengage said pawl from said means for holding said motor driven member for engagement with said pawl.

5. An apparatus as described in claim 4, wherein said motor driven member is formed to provide a recess in which said pawl is disposed, and a threading die is disposed in said member and means is provided holding said die in said motor driven means and includes at least one annular surface on said die disposed to engage the edge of said pawl, said cam surface including a notch, and said pawl being movable partially into said notch and constituting said first disengaging position wherein said pawl disengages said pawl engaging seats but projects partially from said recess and engages said annular surface and movable fully into said notch and constituting said second disengaging position wherein said pawl is substantially fully in said recess and disengages said pawl engaging seats and said annular surface.

6. An apparatus as described in claim 2, wherein there are a plurality of seats on said member including longitudinally extending circumferentially displaced abutments and said pawl extends into engagement with one of the abutments, and means on said member for engaging with the side of the pawl for holding the member in operating position in the drive means.

7. An apparatus as described in claim 6, wherein said means on said member for engaging the side of said pawl includes at least one annular surface.

8. An apparatus as described in claim 6, wherein said pawl has a first disengaging position wherein said pawl is out of engagement with said abutments and in engagement with said means on said member for engaging the side of said pawl and a second disengagement position wherein said pawl is out of engagement with said abutments and said means on the member for engaging the side of said pawl.

9. An apparatus as described in claim 3, wherein said means disposed in the path of travel of the holding means includes a shaft means having a cam surface thereon disposed to contact and actuate said pawl.

10. An apparatus as described in claim 9, wherein said means disposed in the path of travel of the holding means is mounted on said drive means and is rotatable therewith.

11. An apparatus as described in claim 10, wherein said first portion of said means disposed in the path of travel of the holding means includes a ring means disposed to slidingly engage with said holding means as it moves toward said die.

12. An apparatus as described in claim 11, further characteriezd by biasing means normally urging the ring means away from the member.

13. An apparatus as described in claim 1, wherein a housing is provided and wherein said motor driven member comprises a ring gear having gear teeth around its periphery and includes a body formed to provide a pair of side walls and a pawl receiving recess and having bearing portions in engagement with the housing on each side of the gear teeth, said body being formed with apertures, pawl means pivotally mounted in the recess and a die head is provided having pawl engaging abutments and said pawl has a portion engaged with one of the abutments on the die head and has an extension extending opposite to one of the apertures, said means disposed in the path of travel of the holding means including a release ring having posts extending into the apertures, one of said posts being formed with a cam surface having a first portion for engagement with said extension for moving the pawl into engagement with said abutments and a second portion disposed against a side of said pawl for holding the same in position in said ring gear.

14. An apparatus as described in claim 13, wherein said apertures extend through said body, and said posts are insertable into said apertures from either side of said body.

References Cited

UNITED STATES PATENTS

| | | | |
|---|---|---|---|
| 2,046,991 | 7/1936 | Zeller | 10—105 |
| 2,629,886 | 3/1953 | Halligan | 10—124 XR |
| 2,940,093 | 6/1960 | Pealer | 10—105 XR |

FOREIGN PATENTS 840,042  5/1952  Germany.

LEONIDAS VLACHOS, *Primary Examiner.*

U.S. Cl. X.R.

10—105